June 2, 1964     P. D. CARLETON     3,135,318
INTERNAL COMBUSTION ENGINE – HEAT PUMP SYSTEM
Filed Aug. 13, 1959

INVENTOR.
PAUL D. CARLETON
BY
ATTORNEY

United States Patent Office 3,135,318
Patented June 2, 1964

3,135,318
INTERNAL COMBUSTION ENGINE—HEAT PUMP SYSTEM
Paul D. Carleton, 2210 N. Melborn, Dearborn, Mich.
Filed Aug. 13, 1959, Ser. No. 833,407
4 Claims. (Cl. 165—29)

This invention relates to a heat pump system for providing both heating and cooling of an inhabited area. More particularly it relates to such a system which has an internal combustion engine as its prime mover and makes use of the heat content of the exhaust of such engine so as to increase the efficiency of the system during both heating and cooling.

Heat pump devices which mechanically compress and expand refrigerant fluid in order to receive heat from a low temperature source and exhaust it to a higher temperature source are presently used to both heat and cool enclosed inhabited areas such as homes, commercial and industrial buildings and vehicles. While some heat pump installations utilize either the local water supply or the earth as a heat sink, the most universally applicable units utilize the surrounding atmosphere as the heat for this purpose, pumping heat into the atmosphere during the cooling season and pumping heat from the atmosphere during the heating season. However, such systems operate at low efficiencies during the heating season because as the heating requirements of the dwelling area increase with the decrease in outside temperature, the heat content of the atmosphere decreases. Presently, such systems employ electric motors as the source of mechanical energy which is used to compress the refrigerant. It has been suggested that such systems be powered from internal combustion engines rather than electric motors so that the heat of the engine's exhaust gases might be recovered and utilized to increase the overall efficiency of the system.

The present invention relates to such a system having a control arrangement which particularly adapts it to use of residences and commercial buildings.

In such inhabited areas it is desirable to provide means, usually taking the form of a thermostat, whereby the occupants may indicate a desired air temperature which the air conditioning system should achieve. The system must then operate on a cooling cycle when the ambient temperature is greater than that called for and switched to a heating cycle at such times as the ambient temperature is less than that called for. It is therefore desirable to provide means for simply and quickly switching the operation from one cycle to the other under the control of a device which measures the air temperature in the building, stores a representation of the desired air temperature, and compares the two so as to provide appropriate control signals to the air conditioning system.

The present invention contemplates a heat pump system having an internal combustion engine as the prime mover wherein a single mechanical movement which may be accomplished by well known electric or pneumatic actuators, switches the system between its heating and cooling cycles. It further contemplates such a system wherein the valving which accomplishes the switching forms an integral part of the system's circuitry and conforms with its structural organization in such a manner as to minimize the various temperature losses.

While the present invention provides means for quickly switching the system between heating and cooling cycles, a delay occurs between the time that the system is switched to a particular cycle and the time it reaches operating temperature on that cycle. Thus, when the system is initially switched to a heating cycle its output temperature rises over a period of time. The present invention therefore incorporates means for preventing the flow of air from the system until such time that air has reached the proper temperature.

The system switching means of the present invention may be utilized with apparatus wherein the air to be cooled or heated is operated on directly rather than receiving its temperature change from a refrigerant which is compressed and expanded. In such a system, known as an air cycle, the air to be heated receives heat from the exhaust of the engine while on the cooling cycle the air is compressed by the engine and later expanded in such a manner as to lower its temperature. The valving means of the present invention performs exactly the same function in such a cycle as it does in a normally more efficient refrigerant cycle.

The valving of the present invention is made possible through the use of a novel arrangement of thermally operative devices. In a preferred embodiment of the invention, which will subsequently be described in detail, the system utilizes a gas turbine engine employing a centrifugal compressor. A first turbine, powered by compressed, combusted gases, drives the compressor while a second turbine drives a fan and a compressor pump. The fan drives the air to be conditioned through a heat exchanger which has an input from the exhaust of the second turbine during the heating cycle. From the heat exchanger the fan driven air is passed over a set of refrigerant coils which may either act as evaporator or condenser, depending upon the cycle being operated upon. The air is then returned to the room. The valving arrangement is operative to divert the exhaust from the second turbine to a pre-heater for the combustion chamber air during the cooling part of the cycle. The same valving arrangement diverts air from the fan to both sides of the heat exchanger so that it may be passed over both the refrigerant coils in order to use part of the air as a sump. Other auxiliary devices which enhance the efficiency of this system are also contemplated.

Other advantages, applications and objects of the present invention will be made apparent by the following detailed description of two embodiments of the invention. The description makes reference to the accompanying drawings in which.

Figure 2:
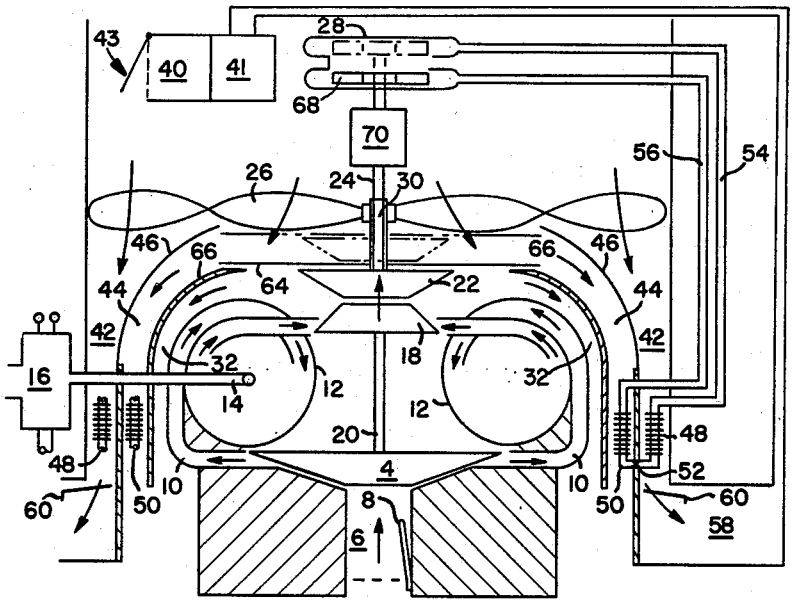
FIGURE 2 is a partial structural view of the embodiment of FIGURE 1 illustrating the operative relationship of the various components.
Figure 1:
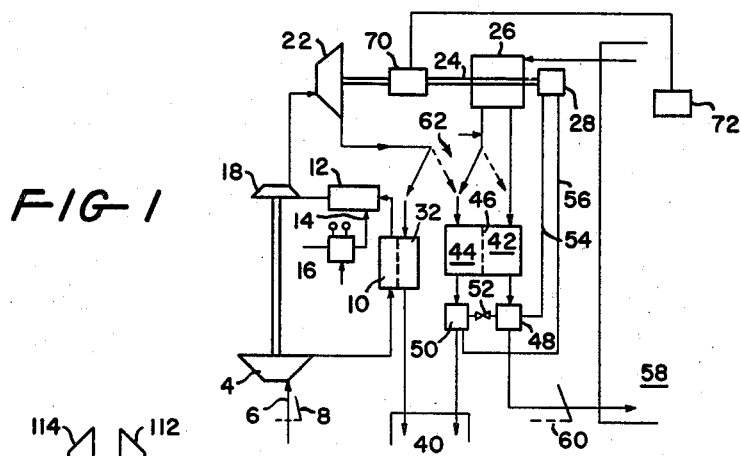
FIGURE 1 is a schematic view of the present invention as applied to a refrigeration cycle.

The application of the present invention to a refrigerant cycle, as is illustrated in FIGURES 1 and 2, wherein like numbers are used to identify equivalent structures, employs a centrifugal compressor 4 to draw in air from the atmosphere surrounding the enclosed area to be conditioned or from the area itself. The air inlet to the compressor 4 is through a passage 6 which may be closed off by a valve 8 in order to decrease the load on the engine during startup.

The compressor 4 pressurizes the air and passes it through a passage 10 which surrounds the compressor outlet. The passage feeds the air into a toroidal combustion chamber 12. The air is admitted to the chamber 12 in a tangential direction so that a swirling effect causes it to be intimately mixed with the fuel which is admitted through a nozzle 14 from a source 16 which may or may not be pressurized depending upon the operating condition of the engine. The fuel source 16 may also comprise a booster pump which provides an auxiliary source of air to the engine during startup or to increase its power output during operation.

An ignition system (not shown) provides the spark for the air fuel mixture.

From the chamber 12 the combusted gases are admitted to a compressor turbine 18 which drives the compressor 4 through a shaft 20. The gases emerge from the compressor turbine 18 axially and are directed to a second power turbine 22. A shaft 24 of the turbine 22 drives an impeller fan 26 and a refrigerant pump, generally indicated at 28. The fan 26 is connected to the shaft 24 through a slidable spine coupling 30, the purpose of which will be subsequently clarified.

In the cooling cycle, which is illustrated in FIGURES 1 and 2, the exhaust gases from the power turbine 22 are diverted radially through a passage 32 which is coaxial with and surrounds the passage 10 which communicates the pressurized air from the compressor 4 to the combustion chamber 12. Passages 10 and 32 thus comprise a preheat exchanger. Therefore, heat is exchanged between the two passages in order to raise the temperature of the pressurized air in the passage 10 and lower the temperature of the exhaust air in the passage 32. This pre-heating of the intake air to the combustion chamber increases the efficiency of the engine cycle. The passage 32 then dumps the exhaust to the surrounding atmosphere, shown diagrammatically as the enclosure for air at 41, through conduit means indicated at 40.

The fan 26 which is driven by the power turbine 22 draws on air from the surrounding atmosphere or the house through the conduit means 40, and during the cooling cycle directs that air through passages 42 and 44 which are coaxial with the passages 12 and 32. A controlled inlet from atmosphere is shown at 43 in communication with the conduit means 40. The radially outer passage 42 and the radially inner passage 44 are separated by a thin heat conductive cylinder 46 so that they act as a heat exchanger. During the cooling cycle however the air passes through both passages directly from the house through conduit means indicated at 58 so no appreciable heat exchange takes place.

A first set of refrigerant coils 48 are disposed within the passage 42 and a second set of coils 50 are disposed within the passage 44. One end of each set of coils connect through an expansion valve 52 while the other end of each of the coils connects to the compressor pump 28. The pump 28 may be operative to direct the flow either to the coil 48 through pipe 54 or to the coil 50 through the pipe 56. During the cooling cycle the pump directs the fluid flow through the line 56 to the coils 50 disposed in the passage 44. This condensation gives off heat into the air passing through the passage 44. The refrigerant is then slowly expanded into the coils 48 through the valve 52 wherein it absorbs heat. The air passing through the passage 42 is thus cooled so that it may be discharged into the area to be conditioned indicated at 41.

The position of the various elements during the heating cycle is indicated by dotted lines in FIGURES 1 and 2. As may be seen in FIGURE 1 the change is simply accomplished by diverting the exhaust from the second turbine 22 to the passage 44 rather than passage 32 and by diverting the air output of the fan 26 exclusively to the passage 42 rather than to the passages 42 and 44. When these changes are made the input from the fan 26 receives heat from the exhaust by a transfer through the heat conductive cylinder 46 between the passages 42 and 44. At the same time the referigerant pump 28 has its flow reversed so as to cause it to direct the compressed refrigerant through the line 54 to the coils 48. The condensataion which takes place in the coil 48 releases heat while the evaporation which occurs in the coil 50 extracts additional, otherwise wasted heat from the exhaust of the second turbine which is passing through the passage 44. A valve 60 is operative to block the movement of air through the passage 42. This valve is normally closed when the heating cycle starts until the temperature of the air in the passage 42 is above that of the air within the area to be heated. Alternatively, it would be possible to provide a clutch (not shown) on the shaft 24 which drives the fan 26, the clutch being open until such time as the system has reached the desired temperature when it could be closed so as to begin to circulate air.

The switch from heating to cooling is accomplished by a valve generally indicated at 62 in FIGURRE 1. As may be seen in FIGURE 2, the valve comprises a circular disc 64 which is appended to the shaft 24 above the second turbine. When the shaft is in its lower position in the cooling cycle as is shown in FIGURE 2, it overlaps the edges of the cylinder 66 which separates the passages 32 and 44. The output of the second turbine 22, which is appended below the disc 64 is then fully directed through the passage 32. The impeller 68 of the compressor pump 28 is attached to the other end of the shaft 24. When the shaft is in its lower position the impeller is so positioned within the pump to direct the refrigerant flow to the line 56.

When the shaft 24 is in a raised position the cycle is switched from cooling to heating. This raises the disc 64 so that it contacts the cylinder 46 which separates the passages 42 and 44.

The output of the turbine 22 is then directed through the passage 44. The disc 64 directs the output of the fan 26 solely through the passage 42. The same movement shifts the impeller 68 of the compressor 28 so as to direct a pressured refrigerant flow through the line 54.

The shifting of the shaft 24 is accomplished by a solenoid 70 which, as shown in FIGURE 1, is controlled from a thermostat 72 in the area to be conditioned. Methods of sensing the temperature in the room and comparing it with the pre-set temperature so as to control the solenoid 70 are well-known.

Figure 3:
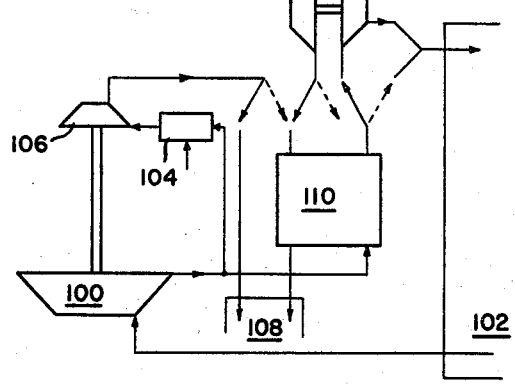
FIG. 3 is a schematic representation of the embodiment of the invention utilizing the air cycle.

FIGURE 3 schematically illustrates the application of the inventive principles to the components of an air cycle. In such a situation the fluid that is operated on by the various components is the same air to be cooled. In FIGURE 3 the cooling cycle is again illustrated with the heating cycle shown by the dotted lines. A turbine driven compressor 100 draws air from the area to be conditioned 102. A portion of this air is directed to a combustion chamber 104 having output to a compressor turbine 106. The exhaust then passes to the atmosphere 108. The remainder of the air which is pressurized by the compressor 100 passes through a heat exchanger 110 and then through an expansion turbine 112. In the turbine 112 the compressed air performs work and is therefore cooled. It then passes back into the conditioned area 102. The compressor 100 may include two successive stages. In this event the air from the first stage is directed to the heat exchanger 110 while air which is passed through both stages is directed to the combustion chamber 104.

In the heat exchanger 110 this compressed air loses heat to ambient air drawn in by a fan 114 which is driven by the turbine 112. The excess energy from the turbine 112 might be used to compress the exhaust of the turbine 106 so as to increase its efficiency. During the heating cycle the exhaust of the turbine 106 is directed through the heat exchanger 110 in place of the ambient air so that it may give up heat to the air from the compressor 100. This air is then passed directly into the conditioned area 102 and the expansion turbine 112 is not utilized. Thus, in this cycle a single valving switch accomplishes a change between cooling and heating.

It is to be understood that various enhancing devices such as are well known in the air conditioning and turbine fields may be utilized in connection with either of the described air or refrigerant cycles.

Having thus described my invention, I claim:

1. A combination heating and cooling system comprising: an enclosure for air to be conditioned; an internal combustion engine having a combustion chamber and an output shaft; a compressor driven by the shaft; means for introducing unconditioned air from the enclosed volume to the compressor; a preheat exchanger having two air passages; means for passing compressed air from the compressor through a first passage of the preheat exchanger to the combustion chamber; a turbine having an output shaft; means for passing exhaust from said engine to the turbine to drive the turbine; a fan; means connecting the fan and the shaft; means for connecting the fan to the enclosure for air to be conditioned so that the fan draws air from such enclosure; a heat exchanger having a first passage and a second passage; means for passing the air output of the fan through the second passage of the heat exchanger; means for passing air from the second passage of the heat exchanger to the enclosure for air to be conditioned; a refrigerant pump driven by the shaft of the turbine; a first refrigerant coil located in the first passage of the heat exchanger; a second refrigerant coil located in the second passage of the heat exchanger; an expansion valve; means connecting each of the refrigerant coils to opposite sides of the expansion valve; a valve having an input side and an output side; means connecting both the exhaust of the turbine and the fan to the input side of the valve and the second passage of the preheat exchanger and the first passage of the heat exchanger to the output side of the valve; the valve having two operative positions, a first wherein it directs air from said fan to said first passage of said heat exchanger and exhaust from said turbine to the second passage of said preheat exchanger, and a second wherein it directs exhaust from said turbine to said first passage of said heat exchanger; means for directing refrigerant flow from said pump to said first refrigerant coil at such time as said valve means is in its first position and to said second refrigerant coil at such time as said first valve means is in its second position; and control means, including a thermostat, operative to switch said valve between its first and second positions.

2. A combination heating and cooling system comprising: an enclosure for air to be conditioned; a combustion engine; a fan; means connecting the fan to the engine; means for providing the fan with air from the enclosure for air to be conditioned; a heat exchanger having a first passage and a second passage; means connecting the output of the fan to the input of said second heat exchanger passage; means for passing the output of the second heat exchanger passage to the enclosure for air to be conditioned; a refrigerant pump driven by said engine; an expansion valve; a pair of refrigerant coils; means connecting one end of each of said coils to opposite sides of the refrigerant pump and the other ends to opposite sides of the expansion valve, each of the refrigerant coils being disposed in one of the passages of said heat exchanger; a valve; means connecting the exhaust of said engine to the input side of the valve; means connecting the output side of said fan to the input side of the valve; means connecting the output side of the valve to said first passage of the heat exchanger; said valve having two operative positions, a first wherein it directs air from said fan to said first passage of said heat exchanger and exhaust to the atmosphere, and a second wherein it directs exhaust to said first passage of the heat exchanger; means for directing refrigerant flow from said pump to either of said refrigeration coils; and control means, including a thermostat, operative to simultaneously switch said valve between its two positions and change the refrigeration coil to which the refrigerant flow is directed.

3. A combination heating and cooling system comprising: an enclosure for air to be conditioned; a combustion engine; a fan; means drivingly connecting the fan to the engine; means connecting the fan to the enclosed air volume; a refrigerant pump driven by said engine; an expansion valve; first and second refrigerant coils; means connecting one end of each of said coils to the opposite sides of the refrigerant pump and the other ends to opposite sides of the expansion valve; a passage surrounding said first refrigerant coil; a passage surrounding said second refrigerant coil; valve means; means connecting the exhaust of the engine to said valve means; means connecting the output of the fan to the valve means; means connecting the output of the valve to the atmosphere; means connecting the output of the valve to said passage surrounding said first refrigerant coil; means connecting the passage surrounding said second refrigerant coil to the enclosure for air to be conditioned; said valve having two operating positions; a first, cooling position wherein it directs air from said fan to said passage surrounding the first refrigerant coil and exhaust from the engine to the atmosphere, and a second, heating position wherein it directs exhaust from the engine to said passage surrounding said first refrigerant coil; directing means for delivering refrigerant flow from said pump directly to said first refrigerant coil at such time as said first valve means is in its cooling position and directly to said second refrigerant coil when said first valve means is in its heating position; and control means, including a thermostat, operative to simultaneously switch said valve means and said directing means between their heating and cooling positions.

4. A heat pump system, comprising in combination: an enclosure for air to be conditioned; a combustion engine having an output shaft; a refrigerant pump; means connecting the shaft of said engine to the pump; an expansion valve; a pair of refrigerant coils; means connecting ends of each of the coils to opposite sides of the refrigerant pump and the other ends to sides of the expansion valve; reversible means in the refrigerant circuit consisting of said pump, expansion valve, and refrigerant coils, disposable in two positions so as to reversibly direct the refrigerant flow from the pump through the circuit; valve means; means connecting the exhaust of the engine to the valve means; means connecting the enclosure for air to be conditioned to said valve means; means connecting the valve means to the space surrounding the two refrigerant coils; said valve means having at least one position wherein it directs the exhaust of the engine through the coil which acts as an evaporator while the air to be conditioned is passed through the coil which acts as a condenser so as to extract heat from the exhaust and transfer it to the air to be conditioned and means for causing said reversible means and said valve means to shift simultaneously.

References Cited in the file of this patent

UNITED STATES PATENTS

| | | |
|---|---|---|
| 2,309,165 | Candor | Jan. 26, 1943 |
| 2,333,729 | Miller et al. | Nov. 9, 1943 |
| 2,409,159 | Singleton | Oct. 8, 1946 |
| 2,471,123 | Rouy | May 24, 1949 |
| 2,491,461 | Wood | Dec. 13, 1949 |
| 2,592,049 | Linforth et al. | Apr. 8, 1952 |
| 2,618,470 | Brown et al. | Nov. 18, 1952 |
| 2,734,443 | Wood | Feb. 14, 1956 |
| 2,777,301 | Kuhn | Jan. 15, 1957 |